United States Patent
Kelly et al.

[11] Patent Number: 6,132,803
[45] Date of Patent: Oct. 17, 2000

[54] TISSUE WITH A MOISTURE BARRIER

[75] Inventors: Stephen Robert Kelly, Owenton, Ky.; Jay Kiyoshi Sato, West Chester, Ohio

[73] Assignee: The Procter & Gamble Company, Cincinnati, Ohio

[21] Appl. No.: 09/287,857

[22] Filed: Apr. 7, 1999

Related U.S. Application Data

[62] Division of application No. 08/813,421, Mar. 10, 1997, Pat. No. 5,968,853.

[51] Int. Cl.⁷ ....................................................... B05D 5/00
[52] U.S. Cl. ............................ 427/244; 427/243; 427/395
[58] Field of Search ................................. 427/244, 245, 427/246, 394, 395, 243

[56] References Cited

U.S. PATENT DOCUMENTS

| | | |
|---|---|---|
| 1,682,346 | 8/1928 | Lorenz . |
| 3,953,638 | 4/1976 | Kemp ........................ 428/154 |
| 4,018,647 | 4/1977 | Wietsma ..................... 162/168 R |
| 4,071,651 | 1/1978 | Hicklin et al. .............. 428/284 |
| 4,489,118 | 12/1984 | Endres et al. .............. 428/154 |
| 4,559,243 | 12/1985 | Passler et al. ............. 427/209 |
| 4,574,021 | 3/1986 | Endres et al. .............. 156/152 |
| 4,618,524 | 10/1986 | Groitzsch et al. .......... 428/198 |
| 4,637,949 | 1/1987 | Manning et al. ............ 428/110 |
| 4,695,422 | 9/1987 | Curro et al. ............... 264/504 |
| 4,788,100 | 11/1988 | Janssen et al. ............ 428/234 |
| 4,816,320 | 3/1989 | St. Cyr ..................... 428/198 |
| 5,128,182 | 7/1992 | Bunker et al. ............. 428/34.3 |
| 5,550,167 | 8/1996 | Desmarais .................. 521/50 |
| 5,563,179 | 10/1996 | Stone et al. ............... 521/64 |
| 5,571,849 | 11/1996 | Desmarais .................. 521/64 |
| 5,578,369 | 11/1996 | Nohr et al. ................ 428/247 |
| 5,582,674 | 12/1996 | Patterson et al. .......... 156/290 |
| 5,595,807 | 1/1997 | Gooding, Jr. et al. ....... 428/80 |
| 5,635,201 | 6/1997 | Fabo ........................ 424/443 |
| 5,635,279 | 6/1997 | Ma et al. ................... 428/174 |
| 5,695,608 | 12/1997 | Yagi et al. ................. 162/135 |

FOREIGN PATENT DOCUMENTS

| | | | |
|---|---|---|---|
| 33252/89 | 11/1989 | Australia ............... | B32B 29/00 |
| 0 144 658 | 6/1985 | European Pat. Off. ..... | D21H 1/02 |
| 0 689 817 A2 | 1/1996 | European Pat. Off. ..... | A61F 13/15 |
| 2045907 | 3/1971 | France . | |
| 02672788 | 8/1992 | France ................. | A47K 10/16 |
| 2441527 A1 | 3/1976 | Germany ............... | D06N 7/00 |
| 9-021094 | 1/1997 | Japan .................. | D21H 19/20 |
| 9-021096 | 1/1997 | Japan .................. | D21H 29/38 |
| 1 504 802 | 3/1978 | United Kingdom ........ | B32B 31/30 |
| 1 599 875 | 10/1981 | United Kingdom ........ | B32B 5/20 |
| 2 085 356 | 4/1982 | United Kingdom ........ | B32B 29/02 |
| 2 119 709 | 11/1983 | United Kingdom ........ | B32B 29/06 |
| WO 95/31500 | 11/1995 | WIPO .................. | C08J 9/28 |
| WO 96/00548 | 1/1996 | WIPO .................. | A61F 13/15 |
| WO 96/15321 | 5/1996 | WIPO .................. | D21H 19/36 |
| WO 96/19511 | 6/1996 | WIPO .................. | C08F 290/14 |
| WO 96/20831 | 7/1996 | WIPO .................. | B32B 27/08 |
| WO 96/21680 | 7/1996 | WIPO .................. | C08F 2/32 |
| WO 96/21682 | 7/1996 | WIPO .................. | C08F 2/32 |
| WO 96/28602 | 9/1996 | WIPO .................. | D06M 15/15 |
| WO 96/33068 | 10/1996 | WIPO .................. | B32B 5/26 |
| WO 97/41301 | 11/1997 | WIPO .................. | D21H 21/16 |

*Primary Examiner*—Shrive Beck
*Assistant Examiner*—Kirsten A. Crockford
*Attorney, Agent, or Firm*—Julia A. Glazer; Larry L. Huston; Donald E. Hasse

[57] ABSTRACT

A tissue which has at least one fibrous ply. A hydrophobically treated foam stratum is placed on at least one of the fibrous plies in order to prevent the penetration of moisture through the tissue. A hydrophobically treated foam can also be impregnated into one or more fibrous plies in order to provide a barrier to the penetration of moisture through the tissue. The invention also comprises a process for making tissue with a foam moisture barrier.

20 Claims, 6 Drawing Sheets

TISSUE WITH A MOISTURE BARRIER

This application is a division of Ser. No. 08/813,421 filed Mar. 10, 1997, now U.S. Pat. No. 5,968,853.

FIELD OF THE INVENTION

This invention relates to providing tissue with a foam moisture barrier suitable for inhibiting the penetration of moisture through the tissue. Also disclosed is a method for making tissue with a foam moisture barrier.

BACKGROUND OF THE INVENTION

Facial tissues, well known in the art, are widely used for blowing the nose. One of the drawbacks commonly encountered with this use concerns the problem of nasal discharge passing through the tissue and soiling the hands of the user. Accordingly, there is a need to provide a tissue with a moisture barrier so as to prevent nasal discharge and other liquids from penetrating through the tissue and soiling the user's hands. Additionally, it is desirable that the tissue be breathable. pliable and quiet.

Foam adhesives have been used to provide adhesion between plies of tissue as illustrated in British Patent Specification No. 1,599,875 issued to Sweens et al. published on Oct. 7. 1981. The drawback of this attempt is that the foam adhesive is not hydrophobic and hence would present an ineffective barrier to moisture penetration.

An attempt to prevent the penetration of moisture through tissue is illustrated in European Patent Application No. 0,144,658 published Jun. 19. 1985 in the name of Endres. Endres teaches applying a water-repellent agent to inhibit transmission of moisture through the tissue. The drawback of this teaching is that the resulting internal barrier layer is admittedly porous. Under typical use conditions. Endress fails to teach a dedicated hydrophobic stratum or layer and hence will alone be insufficient for effectively preventing the penetration of moisture through the tissue.

Other attempts in the art to prevent the penetration of moisture through tissue are illustrated in G.B. Pat. No. 2,119,709 issued to Ellam and published on Nov. 23. 1983. U.S. Pat. No. 4,489,118 issued to Endres et al. on Dec. 19, 1984 and U.S. Pat. No. 4,574,021 issued to Endres et al. on Mar. 4. 1986. In Ellam, a polyvinyl alcohol film is applied to liquid absorbent paper. In both Endres U.S. Pat. Nos. 4,489,118 and 4,574,021, a plastic film is applied to the inner layers of multi-layered tissue. All of these teachings suffer from the drawbacks of being non-porous, non- breathable, stiff and noisy.

Accordingly, the object of this invention is to provide tissue with an effective moisture barrier that is breathable and neither stiff nor noisy. A further objective of this invention is to incorporate a hydrophobic foam into tissue, thereby providing a tissue with an effective barrier to the penetration of moisture.

SUMMARY OF THE INVENTION

This invention relates to a tissue product having at least one fibrous ply. A hydrophobic foam is joined to the fibrous ply in order to prevent the penetration of moisture through the tissue. The hydrophobic foam may be added to either surface of the fibrous ply in the form of a foam stratum.

The tissue of this invention may also comprise two fibrous plies which face one another. A hydrophobic foam stratum may be interposed between the two fibrous plies. Additionally, the tissue of this invention may have three fibrous plies with a hydrophobic foam interposed between the second ply and either the first or third plies.

The hydrophobic foam alternatively can also be impregnated into the fibrous plies. In addition to being hydrophobic, the foam may also be nonabsorbent as well as latex based.

This invention also relates to a process for making tissue with a moisture barrier. The process includes providing a single fibrous ply with two surfaces. A hydrophobic foam stratum is applied to the surface of the fibrous ply.

DETAILED DESCRIPTION OF THE INVENTION

Figure 1:
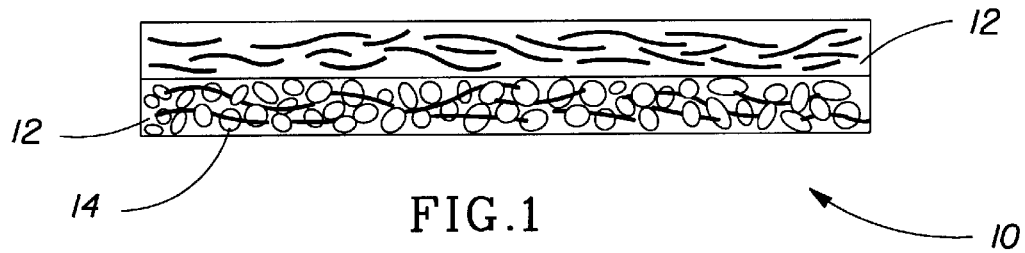
FIG. 1 is a vertical sectional view showing two fibrous plies with a hydrophobic foam impregnated into the second fibrous ply.
Figure 6:
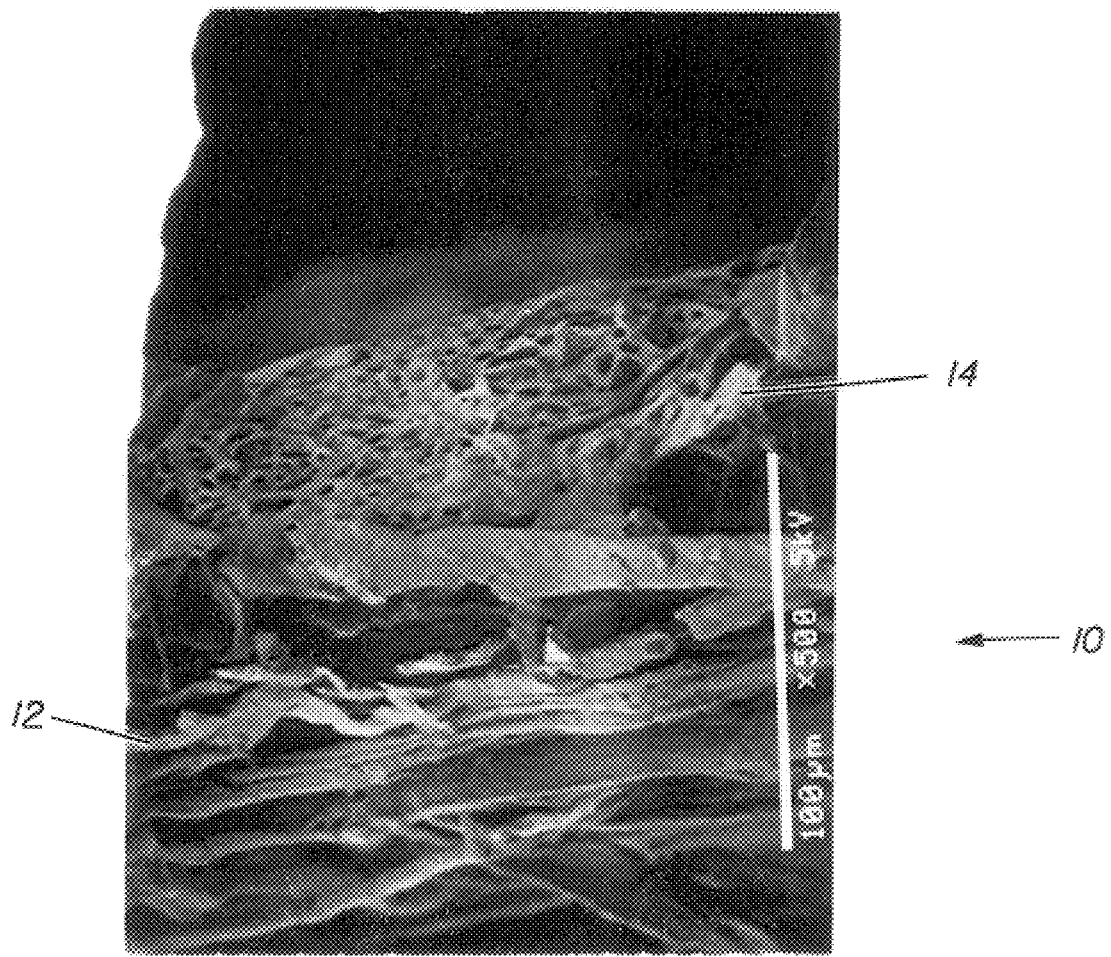
FIG. 6 is a photomicrograph of a single ply tissue with foam stratum joined thereto.

Referring to FIG. 1 and FIG. 6, the present invention is a tissue 10 comprising two components, at least one fibrous ply 12 having two surfaces and a hydrophobic foam 14 joined thereto.

The fibrous ply 12 component of this invention may be made according to commonly assigned U.S. Pat. No. 4,191, 609 issued Mar. 4. 1980 to Trokhan; commonly assigned U.S. Pat. No. 4,300,981 issued to Carstens on Nov. 17, 1981; or commonly assigned U.S. Pat. No. 4,637,859 issued to Trokhan; or commonly assigned U.S. Pat. No. 5,332,118 issued to Muckenfuhs on Jul. 26, 1994; or commonly assigned 5,334,289 issued to Trokhan et al. on Aug. 2, 1994, the disclosures of which are incorporated herein by reference for the purpose of showing how to make fibrous plies 12 suitable for use with the present invention. Though the principle use of this invention is in connection with facial tissues 10, the invention is also applicable to other fibrous products including but not limited to: bath tissue, table napkins, toweling, wipes, and cotton pads. The tissues 10 may be composed of materials which are cellulosic, noncellulosic, nonwovens or a combination thereof.

The fibrous ply 12 component of this invention preferably will have a basis weight of about 8–25 pounds per 3000 square feet and more preferably about 9–13 pounds per 3000 square feet. The fibrous ply 12 may be layered. A minimum amount of wet strength may be added in order to support the wet foam 14. The fibrous ply 12 may be hydrophobic. It may be made hydrophobic by utilizing hydrophobic fibers examples of which include but are not limited to nylons and polyesters. The fibrous ply 12 may also be treated either during or after the papermaking process, with a hydrophobic agent. Suitable hydrophobic agents include but are not limited to: starches, sizing agents, hydrophobic silicones and fluorocarbons.

The tissue 10 needs to have sufficient tensile strength in both the wet and dry states to maintain its integrity during nose blowing and wiping. Additionally, during production, the fibrous ply 12 supports the wet foam 14. Therefore, the fibrous ply 12 must also have sufficient wet strength in order to prevent it from dispersing when wet foam 14 is added thereto. Wet strength may be imparted to the fibrous ply 12 using hydrophobes and/or wet strength resins as are well known in the art. A preferred hydrophobe is Hercon 76, available from Hercules Inc. of Wilmington. Del.

Figure 2:
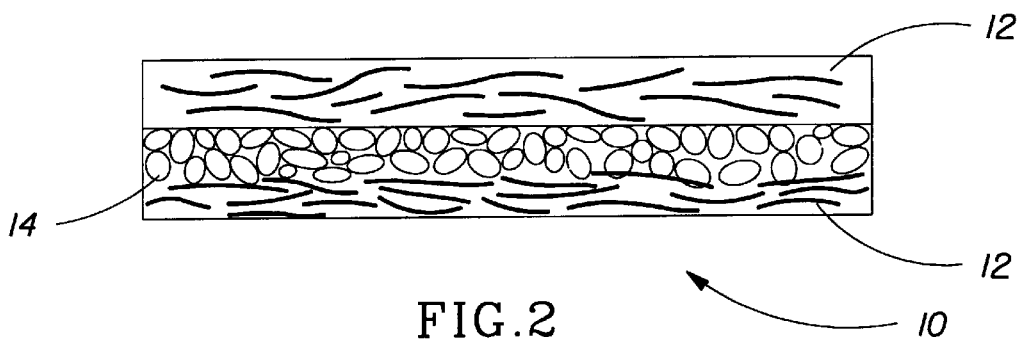
FIG. 2 is a vertical sectional view showing two fibrous plies and a hydrophobic foam stratum interposed between the first and second fibrous plies.
Figure 3:
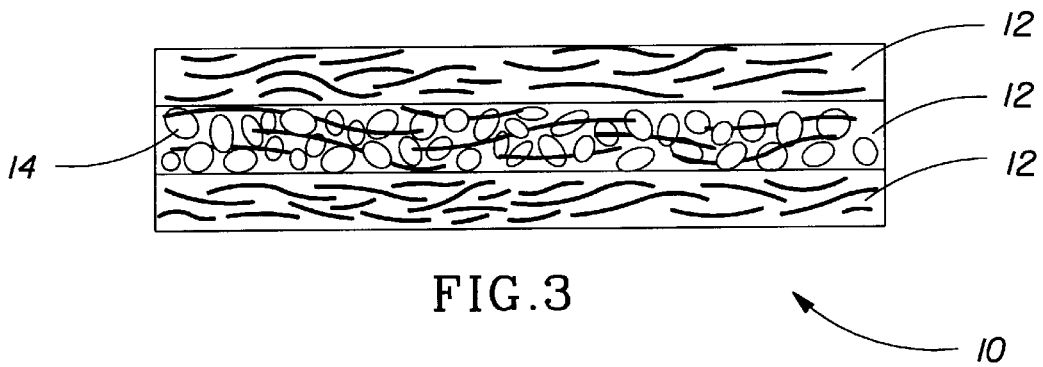
FIG. 3 is a vertical sectional view showing three fibrous plies with a hydrophobic foam impregnated into the second fibrous ply.

The foam 14 component of this invention may be made as shown in FIG. 2, wherein a hydrophobic foam 14 is joined or connected to or placed on the fibrous ply 12. The foam 14 forms a continuous stratum or layer. The foam 14 may be first joined to the fibrous ply 12 and then thermally cured or it may be precured and then joined to the fibrous ply 12. In making this invention, preferably a hydrophobic foam 14 which is latex based is joined to a fibrous ply 12 as illustrated in FIG. 6. The foam 14 may be disposed on one of the surfaces of the fibrous ply 12 so as to form a foam 14 stratum. As shown in FIG. 3, the foam 14 may be impregnated into the fibrous ply 12.

In order to maximize the moisture barrier, the foam 14 utilized in this invention must be hydrophobic either inherently, or by being coated with a hydrophobe. As used herein, a hydrophobic foam 14 would preferably have a contact angle greater than or equal to about 80 degrees, more preferably a contact angle greater than or equal to about 90 degrees, and most preferably a contact angle greater than or equal to about 100 degrees as measured with an optical Gonionmeter.

The foam 14 should also be non-absorbent. The foam 14 should be breathable. A breathable foam 14 allows air to pass through, thereby facilitating moisture removal from the source. Additionally, when compared to a film, the network structure of the foam 14 tends to reduce noise associated with vibration of the material during use.

The foam 14 of this invention is preferably latex-based. Other suitable materials include but are not limited to polyolefin, polypropylene and polyethylene foams 14.

Figure 5:
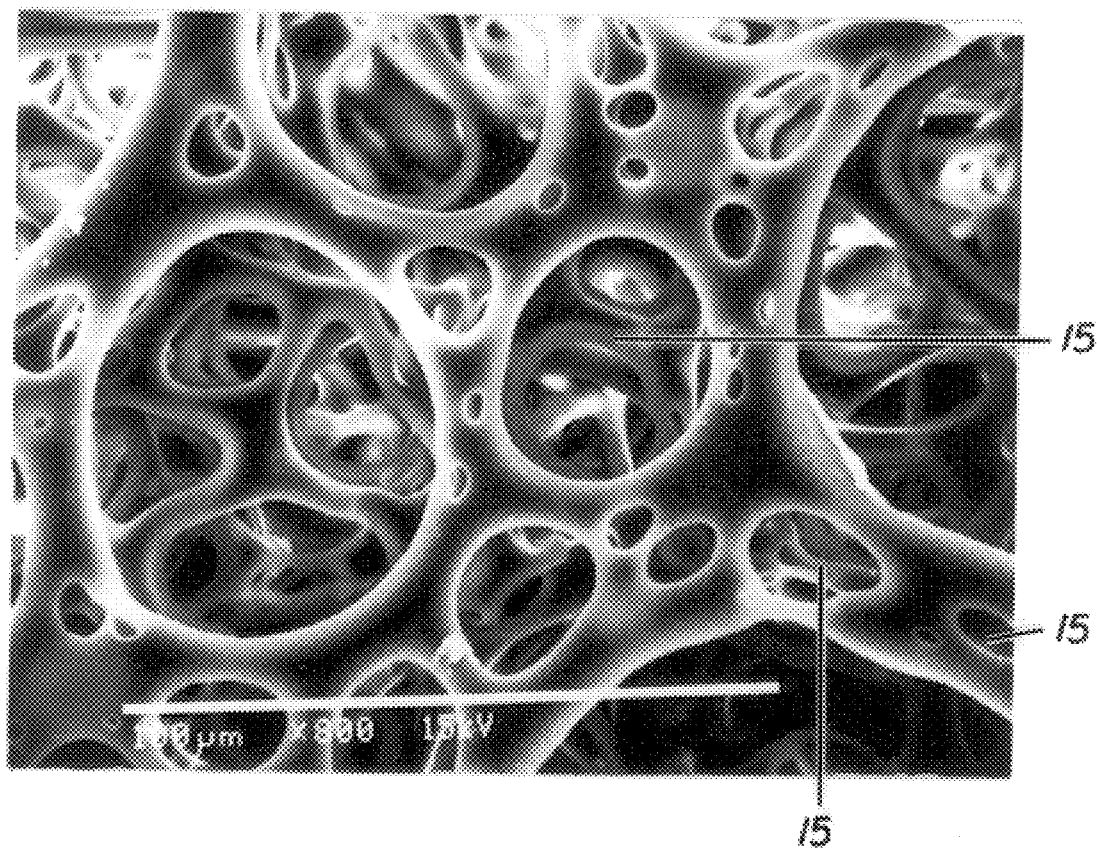
FIG. 5 is a photomicrograph of a latex based foam suitable for use with the present invention.

Referring to FIG. 5, foams 14 may be classified according to the average cell 15 size of the foam 14 after calendering and according to the unfoamed to foamed density ratio of the emulsion before calendering. In order to be effective at inhibiting moisture penetration, it is believed that hydrophobic foams utilized for this purpose should have an approximate preferred average foam cell 15 size range after calendering of about 50 to 150 square microns and a preferred approximate unfoamed to foamed density ratio before calendering of about 8–12.5.

To calculate average foam cell 15 size, a photomicrograph is taken with a scanning electron microscope. The sample which is to be viewed, is prepared according to the sample preparation procedure outlined in commonly assigned U.S. Pat. No. 5,277.761 issued to Van Phan et al. on Jan. 11, 1994 which procedure is incorporated herein by reference. A magnification of 500× is used. It is important that the image shows as much detail in the depth dimension as possible. The image is scanned as a TIFF file. Image analysis software is then used to calculate the various cell 15 areas and also to keep a running count of the number of cells 15 encountered. In calculating average foam cell 15 size for purposes of this invention. NIH-Image, version 1.59, image analysis software, available from the NIMH. Rockville. Md. was used.

Using the computer scanned image, two straight lines of a known length are drawn across the image. The lines should be spaced from each other so as to evenly divide the image into three sections. It should be evident from the photomicrographs that there are layers of cell 15 structures, some above others. Beginning with what can best be identified as the top layer of cells 15, the highlighting tool is used to fill in all the cells 15 which intersect the lines, and NIH-Image is used to calculate the sizes and number of highlighted cells 15. After this is completed, the image is refreshed by removing the highlighting and proceeding with the same steps with what can best be identified as the second layer. This process is continued until all visible layers have been identified in this way, all the while keeping a running data base on all the cell 15 sizes and the total count.

In certain cases it may be necessary to estimate the amount of a cell 15 to be highlighted since it may be partially hidden by layers above it. These should be accounted for in the average cell 15 size calculation. With this data base of information, the approximate average cell 15 size can be determined as well as an approximate value for the number of cells 15 per linear distance. For this invention, average cell 15 sizes range from about 50 to 150 microns.

Figure 4:
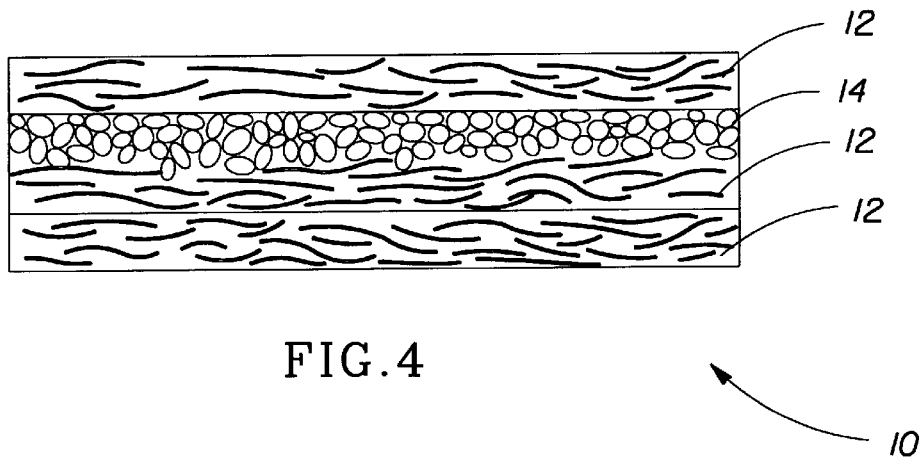
FIG. 4 is a vertical sectional view showing three fibrous plies with a hydrophobic foam stratum interposed between the first and second fibrous plies.

Referring to FIG. 2 and FIG. 4, the invention can further be comprised of two or more fibrous plies 12 joined in a face to face relationship with the foam 14 therebetween. Joining of the fibrous plies 12 may be accomplished by ply bonding as disclosed in commonly assigned U.S. Pat. No. 4,481,243 issued Nov. 6, 1984 to Allen, or as disclosed in commonly assigned U.S. Pat. No. 5,294,475 issued Mar. 15. 1994 to McNeil, or as disclosed in commonly assigned U.S. Pat. No. 3,414,459 issued Dec. 3, 1968 to Wells, or as disclosed in U.S. Pat. No. 3,867,225 issued Feb. 18, 1975 to Nystrand, which patents are incorporated herein by reference.

This invention is not limited to only single fibrous ply 12 or two fibrous ply 12 embodiments, but can also include embodiments (not shown) utilizing more than two fibrous plies 12 and multiple foam 14 strata. Likewise, the invention can also include multiple fibrous plies 12 with one or more fibrous plies 12 impregnated with hydrophobic foam 14. The tissues 10 of this invention may also contain combinations of the two embodiments wherein at least one of the fibrous plies 12 has a foam 14 stratum disposed on its surface while one other fibrous ply 12, or the opposed surface of the same fibrous ply 12 may be impregnated with foam 14.

EXAMPLE I

A fibrous ply 12 was layered with 35.5% Eucalyptus on the wire side layer; 29% Northern Softwood Kraft (NSK) in the center layer; and 35.5% Eucalyptus on the fabric side layer. The fibrous ply 12 was hydrophobically treated by adding approximately a total of 4.8 pounds per ton (based on daily production at the reel) of alkyl ketene dimer to the Eucalyptus layers prior to the headbox. A commercially available alkyl ketene dimer. Hercon 76, available from Hercules Inc., Wilmington. Del. was utilized. A 1% solution of Kymene 557H, a wet strength agent commercially available from Hercules Inc. was also added to the NSK layer at a rate of 871 cubic centimeters per minute prior to the headbox.

The fibrous ply 12 was conventionally dewatered with a press felt, dried, and wound in a roll 20. It had a basis weight of 12.6 pounds per 3000 square feet. The machine direction wet tensile of the fibrous ply 12 was 116 grams per inch.

The foam 14 was made by combining in the following order: water, latex, thickening agents, foaming agents, a crosslinking catalyst and a hydrophobic agent. The ingredients were placed in a 55 gallon drum. As each ingredient was added to the drum, the mixture was manually stirred with a paddle for twenty seconds. After all ingredients were added, the mixture was stirred for two minutes. In this example, 6.66 liquid pounds of water were used. The latex utilized, Rhopiex E-2780 (15.16 liquid pounds), was supplied by Rohm and Haas Company of Philadelphia. Pa. Two thickening agents, Acrysol-95NP (0.29 liquid pounds) and Acrysol-60 (0.72 liquid pounds), both supplied by Rohm and Haas, were utilized. Two foaming agents, Stanfax 320 (0.65 liquid pounds) and Stanfax 318 (0.25 liquid pounds), both supplied by Standard Adhesive and Chemical Co. Inc. of Dalton, Ga., were used. A 25% ammonium nitrate solution (0.26 liquid pounds), supplied by Fisher Scientific of Pittsburgh, Pa. was used as a crosslinking catalyst. Zonyl 8412 (6.00 liquid pounds), supplied by DuPont of Wilmington, Del., was used as a hydrophobic agent.

After combining and mixing all the ingredients, the foam emulsion was then added to a mechanical foamer. A foamer, supplied by Textile Rubber and Chemical Co. of Dalton. Ga. was used to create the foam 14. The approximate foamer settings were a 37 rpm pump flow, a 290 rpm head speed, and an air injection setting of 1 as indicated by the foamer air flow gauge.

Figure 7:
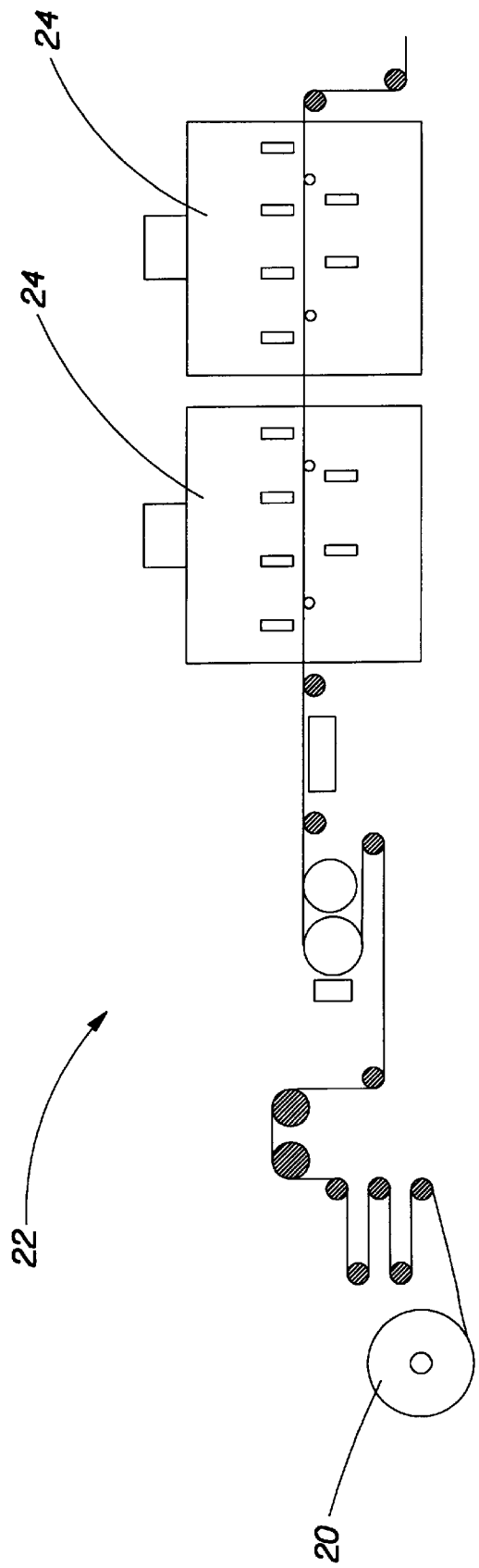
FIG. 7 is a schematic side elevational view of an apparatus for making the present invention.

The foam 14 was applied directly to the fibrous ply 12 which had been treated with the Hercon 76. The foam 14 was applied on a continuous basis to the fibrous ply 12 according to the foam applicator 22 shown in FIG. 7. The foam 14 thickness was metered with a doctor blade having a blade gap of approximately 5 mils. The basis weight of the dry foam 14 was approximated at about 12.2 pounds per 3000 square feet. The fibrous ply 12 which had been unwound from the roll 20 was run at 6 feet per minute with a 14% draw between the foam applicator 22 and rewind point. The fibrous ply 12 and foam 14 stratum were dried in ovens 24 at 390 degrees F for eighty seconds and then calendered at a pressure of 1000 pounds per square inch.

The two outer fibrous plies 12 were comprised of 60% Eucalyptus on the wire side and 40% Northern Softwood Kraft (NSK) on the fabric side. A 1% Kymene solution was added as a wet strength agent to the NSK at a rate of 700 cubic centimeters per minute. A dry strength resin was added to the Eucalyptus, comprising a 0.5% solution of Carboxymethylcellulose (CMC), supplied by Hercules Inc. at a rate of 525 cubic centimeters per minute and a 1% solution of a chemical softening agent was also added to the Eucalyptus. Both of the outer plies were through air dried according to commonly assigned U.S. Pat. No. 4,239,065 issued to Trokhan, and then wound on a roll 20. The basis weight of each outer fibrous ply 12 was about 10.2 pounds per 3000 square feet. The fibrous ply 12 and foam 14 stratum were then combined with the two unwound outer fibrous plies 12. This example represents Embodiment 4 found in Table I.

Figure 8:
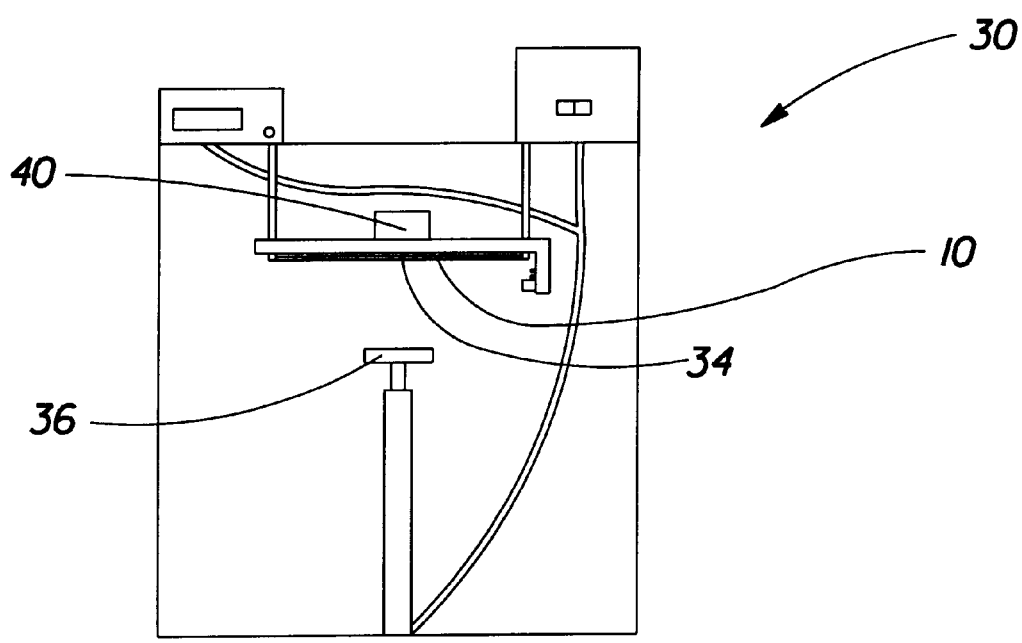
FIG. 8 is a perspective view of an apparatus for measuring moisture barrier penetration.
Figure 9:
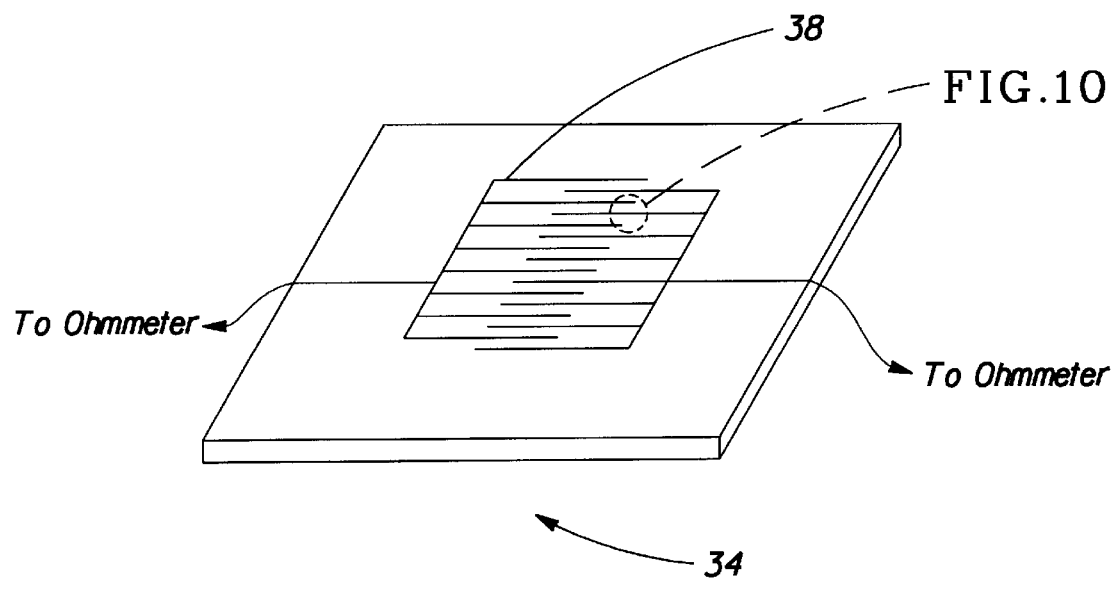
FIGS. 9–10 are perspective and enlarged fragmentary views, respectively, of the grid plate assembly and grid used for the Moisture Barrier Penetration Test apparatus.
Figure 10:
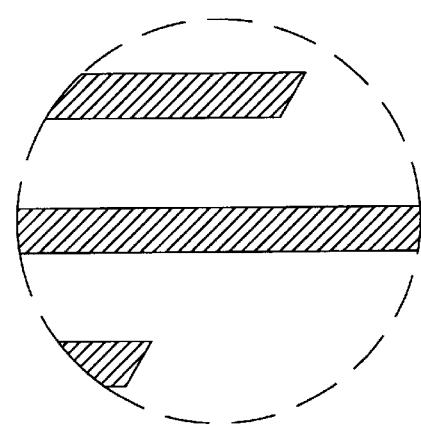

Referring to Table I, Moisture Barrier Penetration tests were conducted on twelve tissues using the apparatus 30 of FIG. 8. The Moisture Barrier Penetration Test measures the amount of time required for 0.5 milliliters of a 2% saline solution to soak through a tissue 10 sample at a given pressure. A tissue sample 32 of at least 3.5 inches by 4 inches was used. The tissue 10 was clamped to a free-floating grid plate assembly 34 measuring 6 inches by 6 inches. The assembly was turned so that the tissue 10 faced a Plexiglas base 36. Referring to FIGS. 9 and 10, the grid plate assembly 34 contains a grid 38 made of cold solder which is connected to two electrode terminals. The electrode terminals are connected to an Ohmmeter (not shown).

Each type of tissue 10 was tested at five different pressures. As shown in FIG. 8, multiple 5.0 pound weights 40 were used to obtain the appropriate pressure. The proper number of weight(s) 40 required to create the appropriate pressure were added to (or removed from) the top side of the free-floating grid plate assembly 34 as needed. The chart below indicates the number of five pound weights 40 required to achieve the desired pressure.

| No. of 5.0 pound weights required | Pressure (PSI) |
| --- | --- |
| 0 | 0.1 |
| 1 | 0.5 |
| 2 | 0.8 |
| 3 | 1.2 |
| 4 | 1.5 |

Then. 0.5 milliliters of a 2% saline solution was applied to the Plexiglas base 36 with a syringe. The saline solution soaks through the tissue 10 and makes an electrical connection with the grid 38. The base was then placed in contact with the tissue 10. A timer was automatically activated as soon the base supported the full weight of the plate. The moisture penetration time is the time required for the Ohmmeter to read a resistance of less than 20 milliohms.

Tissue 10 made according to the present invention, has a Moisture Barrier Penetration Test time at 0.1 PSI of preferably greater than 15 seconds, more preferably greater than 30 seconds, even more preferably greater than 60 seconds. and most preferably greater than 180 seconds. At 0.5 PSI, tissue 10 made according to this invention has a moisture penetration time of preferably greater than 15 seconds, more preferably greater than 30 seconds, even more preferably greater than 60 seconds and most preferably greater than 180 seconds. At 1.2 PSI, tissue 10 made according to this invention has a moisture penetration time of preferably greater than 10 seconds, more preferably greater than 20 seconds, even more preferably greater than 40 seconds and most preferably greater than 120 seconds. At 1.5 PSI, tissue 10 made according to this invention has a moisture penetration time of preferably greater than 5 seconds, more preferably greater than 20 seconds, even more preferably greater than 40 seconds, and most preferably greater than 60 seconds.

Air permeability (porosity) measurements were also measured on each tissue 10 type. Air permeability is carried out by measuring the rate of air flow in cubic feet per minute per square foot (CFM/sq. ft.) through a given area of sample under a constant pressure drop of 0.5 inches of water. For measuring air permeability, an Air Flow Tester, Model 9025 PG. manufactured by Instrument Marketing Services Co., Inc. of Hoboken. N.J., was used. Air permeability was measured on a single ply of tissue 10 measuring four inches by four inches.

Referring to Table I. Column 1, the first six tissues tested were commercially available products: Puffs Soft and Strong tissues; Puffs Plus With Aloe and Vitamin E tissues: and Puffs Advanced Extra Strength tissues all sold by the instant assignee, Kleenex tissues; Kleenex ColdCare Ultra Comfort tissues; and Kleenex ColdCare With Lotion tissues; all sold by Kimberly-Clark Corporation of Dallas. Tex. The other six tissues are embodiments of the current invention. In embodiments 1–3, the two outer plies which were combined with the center fibrous ply 12 and foam 14 stratum were taken from vintage Puffs Extra Strength tissues. In embodiments 4–6, the two outer plies combined with the center fibrous ply 12 and foam 14 stratum were made according to the process described above in Example I.

Referring to Table I, Columns 8–12, indicate the moisture penetration time at a given pressure for each tissue type while Column 13, indicates the air permeability (porosity) of each tissue type.

TABLE I

| 1 Tissue Type | 2 No. of Plies | 3 Approximate Amount of Foam (lbs./3000 sq. ft.) | 4 Emulsion % Water (%) | 5 Approximate Average Bubble Size (sq. μm) | 6 Foam Density (g/cc) | 7 Foam Hydrophobe | 8 0.1 psi (sec.) | 9 0.5 psi (sec.) | 10 MOISTURE PENETRATION TIME 0.8 psi (sec.) | 11 1.2 psi (sec.) | 12 1.5 psi (sec.) | 13 Air Perm (single ply) (CFM/ ft² @ 0.5" water) |
|---|---|---|---|---|---|---|---|---|---|---|---|---|
| Puffs Soft & Strong | 2 | na | na | na | na | na | 0.11 | 0.14 | 0.13 | 0.14 | 0.16 | 214 |
| Puffs Plus w/Aloe & Vitamin E | 2 | na | na | na | na | na | 0.06 | 0.08 | 0.09 | 0.10 | 0.12 | na |
| Puffs Advanced Extra Strength | 2 | na | na | na | na | na | 0.14 | 0.16 | 0.16 | 0.17 | 0.20 | 202 |
| Kleenex | 2 | na | na | na | na | na | 0.07 | 0.10 | 0.10 | 0.11 | 0.13 | 177 |
| Kleenex Cold-Care Ultra | 3 | na | na | na | na | na | 0.06 | 0.08 | 0.09 | 0.11 | 1.12 | na |
| Kleenex Cold-Care Ultra w/Lotion | 3 | na | na | na | na | na | 0.65 | 0.06 | 0.07 | 0.08 | 0.10 | na |
| Embodiment 1 | 3 | 12.9 | 70 | 93 (est.) | 0.09 | ScotchGard spray | not tested | not tested | 43 | <1 | not tested | not tested |
| Embodiment 2 | 3 | 16.0 | 70 | 89 (est.) | 0.08 | ScotchGard spray | not tested | not tested | 62 | 1 | not tested | not tested |
| Embodiment 3 | 3 | 17.2 | 70 | 111 (est.) | na | ScotchGard spray | not tested | not tested | not tested | 124 | 58 | 4.0 |
| Embodiment 4 | 3 | 12.2 | 70 | 111 (est.) | 0.12 | Zonyl 8412 @ 20% by weight | >180 | >180 | >180 | 161 | 80 | 6.9 |
| Embodiment 5 | 3 | 11.6 | 65 | not known | 0.13 | Zonyl 8412 @ 20% by weight | >180 | >180 | 179 | 38 | <1 | 10.4 |
| Embodiment 6 | 3 | 8.2 | 70 | 111 (est.) | 0.11 | Zonyl 8412 @ 20% by weight | >180 | >180 | 61 | <1 | not tested | 12.2 |

What is claimed is:

1. A process for producing tissue with a moisture barrier, said process comprising the steps of:
   providing a single first fibrous ply having opposed first and second surfaces,
   applying a hydrophobic foam stratum to said second surface.

2. The process according to claim 1 wherein said hydrophobic foam is cured on said first fibrous ply to form a unitary sheet of tissue.

3. The process according to claim 1 wherein said hydrophobic foam stratum has an inner surface oriented towards said first fibrous ply and an outer surface oppositely disposed relative to said first surface, said outer surface being exposed: further comprising the steps of providing a second fibrous ply and joining said second fibrous ply to said hydrophobic foam stratum.

4. The process according to claim 1 wherein said hydrophobic foam is thermally curable.

5. The process according to claim 1 wherein said fibrous ply is cellulosic.

6. The process according to claim 1 wherein said hydrophobic foam stratum is impregnated within said fibrous ply.

7. The process according to claim 3, said process further comprising:
   providing a third fibrous ply,
   joining said third fibrous ply to said second fibrous ply.

8. The process according to claim 7, said process further comprising:
   providing a fourth fibrous ply,
   interposing a second hydrophobic foam stratum between said third fibrous ply and said fourth fibrous ply.

9. The process according to claim 8, said process further comprising joining said second hydrophobic foam stratum to said third fibrous ply and to said fourth fibrous ply.

10. The process according to claim 7, said proces further comprising:
    impregnating said third fibrous ply with a hydrophobic foam,
    providing a fourth fibrous ply,
    joining said third fibrous ply to said fourth fibrous ply.

11. The process according to claim 3, said process further comprising:
    impregnating said second fibrous ply with a hydrophobic foam, providing a third fibrous ply, joining said third fibrous ply to said second fibrous ply.

12. A process for producing tissue with a moisture barrier, said process comprising the steps of:

providing one or more fibrous plies, impregnating at least one of said fibrous plies with a hydrophobic foam.

13. A process for producing tissue with a moisture barrier, said process comprising the steps of:

providing one or more fibrous plies, joining a hydrophobic foam to at least one of said fibrous plies.

14. The process according to claim 13 further comprising treating at least one of said fibrous plies with a hydrophobic agent.

15. The process according to claim 1 wherein said hydrophobic foam stratum has a contact angle of at least 80 degrees.

16. The process according to claim 8 wherein said second hydrophobic foam stratum has a contact angle of at least 80 degrees.

17. The process according to claim 12 wherein said hydrophobic foam has a contact angle of at least 80 degrees.

18. The process according to claim 12 wherein said hydrophobic foam is non-absorbent.

19. The process according to claim 13 wherein said hydrophobic foam has a contact angle of at least 80 degrees.

20. The process according to claim 13 wherein said hydrophobic foam is non-absorbent.

* * * * *

UNITED STATES PATENT AND TRADEMARK OFFICE
CERTIFICATE OF CORRECTION

PATENT NO.    : 6,132,803
DATED         : October 17, 2000
INVENTOR(S)   : Stephen R. Kelly et al.

It is certified that error appears in the above-identified patent and that said Letters Patent is hereby corrected as shown below:

Column 1,
Lines 22 and 35, "." should read -- , --.

Column 4,
Line 62, "." should read -- , --.

Column 5,
Line 13, "Rhopiex" should read -- Rhoplex --.

Signed and Sealed this

Thirtieth Day of July, 2002

*Attest:*

JAMES E. ROGAN
*Director of the United States Patent and Trademark Office*

*Attesting Officer*